No. 759,750. PATENTED MAY 10, 1904.
G. ROSENTHAL.
APPARATUS FOR THE INTRODUCTION OF PULVERULENT SUBSTANCES
INTO CONVERTERS, &c.
APPLICATION FILED JUNE 15, 1903.
NO MODEL.
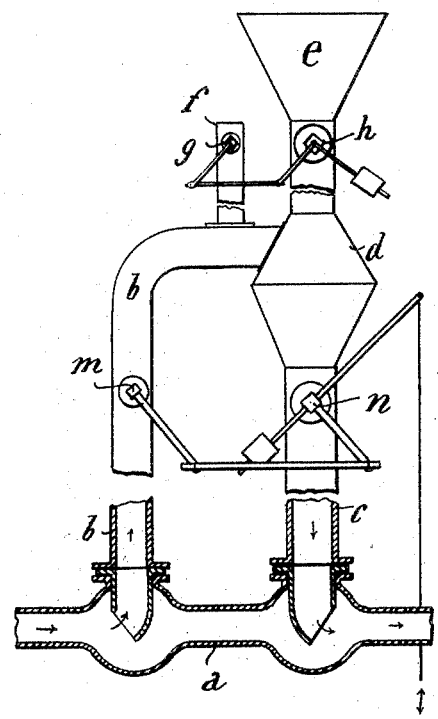
Witnesses.
Caspar Richard Brenne
Ernst Brenne
Inventor.
Gustav Rosenthal No. 759,750.

Patented May 10, 1904.

UNITED STATES PATENT OFFICE.

GUSTAV ROSENTHAL, OF LETMATHE, GERMANY.

APPARATUS FOR THE INTRODUCTION OF PULVERULENT SUBSTANCES INTO CONVERTERS, &c.

SPECIFICATION forming part of Letters Patent No. 759,750, dated May 10, 1904.

Application filed June 15, 1903. Serial No. 164,742. (No model.)

*To all whom it may concern:*

Be it known that I, GUSTAV ROSENTHAL, metallurgist, a citizen of the German Empire, and a resident of Letmathe, in the Province of Westphalia, Kingdom of Prussia, German Empire, have invented certain new and useful Improvements in Apparatus for the Introduction of Pulverulent Substances into Converters, Blast-Furnaces, and the Like, of which the following is a full, clear, and exact description.

The object of the present invention is a safely and accurately working apparatus by means of which it is possible to load at one time the blast-air or blast-gases of converters with large quantities of pulverulent substances for the sake of conveying them to the metallurgic apparatus. Such substances also include fluxes and combustibles, deoxidizing and recarburizing agents, and fluxes for the cleansing of iron. It is especially for the converting process of the greatest importance that a certain quantity of blast-air should receive a certain quantity of pulverulent substance and that this quantity can be regulated at will, so that with all the variations of the velocity of the blast-current the quantity of the powder introduced will vary, so that the volume of the quantity of pulverulent substance received by the blast-current will always remain proportional to the quantity of blast-air or to the speed of the same. This is attained in a perfect manner by the device which forms the subject of this application by providing the receptacle filled with the pulverulent substance with two pipes starting from the same which terminate with the open ends in the blast-conduit in a way that the blast-current passes close to them and effects in accordance with the principle of Fletcher's anemometer in the end of one of the pipes a compression proportional to the velocity of the blast-current and in the end of the other pipe a partial vacuum, also proportional to the velocity of the blast-current. The compression caused in the end of the one pipe constantly tends to compensate the vacuum caused in the end of the other, so that always a quantity of pulverulent substance proportional to the velocity of the blast-current is taken up by this current.

The special arrangement of the apparatus is as follows: Above the blast-conduit $a$ there is affixed on a pipe $c$, terminating with its open end into the blast-conduit in the direction of the current, a receptacle $d$, intended to receive the pulverulent substance, which carries a second pipe $b$, starting from it above the point where the pipe $c$ enters it, which abuts with its other open end also into the blast-conduit in a direction contrary to that of the current, but being the first pipe the current comes to. The ends of the tubes $b$ and $c$ may be inserted in any suitable manner into the blast-conduit vertically or slantingly on the top or on the side. The sucking-pipes $c$ may also abut more or less vertically or more or less slantingly into the blast-conduit. All that is necessary is that the blast-current should be able to exert an evacuating effect upon the interior of the pipe.

The receptacle $d$, which may be of any shape and size, stands in communication with a hopper $e$ and the pipe $b$, or the receptacle itself is provided with a ventilating-socket $f$, whose outlet-organ $g$ is moved simultaneously with the passage or outlet-organ $h$ of the hopper, so that on the receptacle $d$ being filled the air can escape through the socket $f$. In the pipes $b$ and $c$ throttle-valves or cocks $m$ and $n$ have been inserted, which can also be regulated simultaneously. If now the receptacle $d$, filled with the pulverulent substance, is put in communication with the blast-conduit through a corresponding adjustment of the valves $m$ and $n$, the substance is sucked off by the vacuum in the pipe $c$ under the pressure reigning in the pipe $b$ and the receptacle $d$, and the receptacle is emptied with a rapidity proportional to the velocity of the blast-current and the pressure in the receptacle $d$ and the vacuum in the pipe $c$ to be compensated, and this regulatable quantity of the pulverulent substance is conveyed to the blast-conduit and to the blast-air to be carried by the same to the metallurgic apparatus.

What I claim as my invention, and desire to secure by Letters Patent of the United States, is—

In a device for introducing pulverulent substances into converters, blast-furnaces, the combination with the blast-conduit $a$, of two pipes b and c abutting into the same, more or less vertically and in opposite directions opposed to and in the direction of the blast-current, the receptacle d arranged above the pipe c containing the pulverulent substances, communicating with each other and thereby adapted to, on the blasting-current passing through the blasting-conduit, produce a pressure in one of the pipes and a corresponding vacuum in the other, under the influence of which a quantity of the pulverulent substance, proportional to the velocity of the blasting-current, is sucked off from the receptacle and carried by the blasting-gases to the metallurgic apparatus, substantially as and for the purpose set forth.

In testimony whereof I have signed my name to this specification in the presence of two subscribing witnesses.

GUSTAV ROSENTHAL.

Witnesses:
    CASP RITH BRENNE,
    ERNST BRENNE.